United States Patent
Matushima et al.

(10) Patent No.: US 7,503,492 B2
(45) Date of Patent: Mar. 17, 2009

(54) OPTICAL INFORMATION READING APPARATUS AND RELATED INFORMATION READING METHOD

(75) Inventors: Takeshi Matushima, Kariya (JP); Motoaki Watabe, Aichi-ken (JP)

(73) Assignee: Denso Wave Incorporated, Tokyo (JP)

( * ) Notice: Subject to any disclaimer, the term of this patent is extended or adjusted under 35 U.S.C. 154(b) by 868 days.

(21) Appl. No.: 10/893,879

(22) Filed: Jul. 20, 2004

(65) Prior Publication Data

US 2005/0051627 A1 Mar. 10, 2005

(30) Foreign Application Priority Data

Sep. 8, 2003 (JP) ............................. 2003-315537

(51) Int. Cl.
*G06K 7/10* (2006.01)
*G06K 7/14* (2006.01)

(52) U.S. Cl. .................. 235/454; 235/494; 235/439

(58) Field of Classification Search ............... 235/454, 235/498, 462.1, 462.09, 462.32, 439, 494
See application file for complete search history.

(56) References Cited

U.S. PATENT DOCUMENTS

| | | | |
|---|---|---|---|
| 5,500,516 A | 3/1996 | Durbin | |
| 6,034,379 A | 3/2000 | Bunte et al. | |
| 6,678,412 B1 | 1/2004 | Shigekusa et al. | |
| 7,240,842 B2 * | 7/2007 | Hara et al. | 235/462.2 |
| 2002/0199149 A1 * | 12/2002 | Nagasaki et al. | 714/752 |

FOREIGN PATENT DOCUMENTS

| | | |
|---|---|---|
| JP | 2000-353210 | 12/2000 |
| JP | 2001147987 | 5/2001 |
| JP | 2002-92542 | 3/2002 |
| JP | A-2002-140662 | 5/2002 |
| WO | 93/18478 | 9/1993 |
| WO | 99/64980 | 12/1999 |
| WO | 02/063543 | 8/2002 |

OTHER PUBLICATIONS

First Office Action from Chinese Patent Office issued on May 15, 2006 for the corresponding Chinese patent application No. 200410076856.3 (English translation thereof).
Communication from the European Patent Office issued on Aug. 22, 2008 in connection with the corresponding European Patent Application No. 04016984.9-2210 / 1513095.

* cited by examiner

*Primary Examiner*—Edwyn Labaze
(74) *Attorney, Agent, or Firm*—Posz Law Group, PLC

(57) ABSTRACT

A guide light indicating a rectangular reading portion, smaller than an imaging visual field of an area sensor, is irradiated on a reading objective. A control unit, under the irradiated guide light, causes the area sensor to capture a first image. Then, the control unit detects the position of the guide light based on captured first image data. Then, with no irradiation of the guide light, the control unit causes the area sensor to capture a second image. The control unit then estimates an existing region of a two-dimensional code in the second image. The control unit selects, as a processing objective, only a code that is completely contained in the reading portion and executes the decode processing only for the selected code. When failed in a reading operation, the control unit expands a processing objective region and executes the decode processing again.

19 Claims, 8 Drawing Sheets

OPTICAL INFORMATION READING APPARATUS AND RELATED INFORMATION READING METHOD

BACKGROUND OF THE INVENTION

The present invention relates to an optical information reading apparatus having a two-dimensional imaging visual field for reading a bar code and other one-dimensional codes as well as a QR code and other two-dimensional codes. Furthermore, the present invention relates to an optical information reading method.

Conventionally, for the purpose of administrating merchandise sales and inventories, bar codes and other one-dimensional codes or QR codes and other two-dimensional codes are widely used in various systems. To optically read these codes, conventional optical information reading apparatuses are generally equipped with an area sensor and arranged as a handy type two-dimensional code reading apparatus (i.e. a handy terminal) that enables users to perform a manual reading operation. According to this kind of optical information reading apparatus, a reading section is provided at a front end thereof to enable a user to locate this reading section to the vicinity of a two-dimensional code recorded or printed on a reading objective, such as a catalog, a voucher, and merchandise label. Under this condition, the user operates a trigger switch to cause the reading apparatus to start an image-pickup operation for imaging the two-dimensional code or the like and a reading operation for reading (decoding) the picked-up image of the code.

In recent years, the above-described systems are required to use highly densified codes so that many information codes can be recorded in a limited small area. To satisfy these requirements, there is the tendency that the code reading apparatus uses an area sensor having an increased number of pixels to improve the resolution. However, if two-dimensional codes are downsized, there will be a problem such that a plurality of codes may be simultaneously captured in the same imaging visual field. This is not desirable in that the read processing must be done unnecessarily to read another code that the user does not want to read. Furthermore, such decode processing will take a long time when the pixel number of the area sensor is large.

Meanwhile, there is a conventional reading apparatus that provides a partial region reading mode which enables the apparatus to read only a code located at an intermediate portion of an imaging visual field of an area sensor in the vertical direction. According to this conventional apparatus, it becomes possible to read only a code wanted by a user in a case that plural codes arrayed in a multi-stage pattern are present on a reading objective (for example, refer to the Japanese Patent Application Laid-open No. 2002-92542).

Furthermore, there is another conventional reading apparatus that divides a picked-up image region into a plurality of blocks to effectively detect an existing region of a code in the picked-up image and perform a decoding operation in the detected existing region. According to this conventional reading apparatus, it becomes possible to shorten the processing time (for example, refer to the Japanese Patent Application Laid-open No. 2000-353210 corresponding to the U.S. Pat. No. 6,678,412).

However, in the case of providing the partial region reading mode as described in the Japanese Patent Application Laid-open No. 2002-92542, this mode will be effective in a case that bar codes are aligned in the vertical direction. However, if two-dimensional codes are present next to each other in the right-and-left direction, there will be a problem that selecting a code to be read in a two-dimensional space is difficult. Furthermore, there will be room for further shortening the processing time. According to the latter prior art document characterized by estimating the existing region of such a code, there is also room for improvement in view of shortening of the processing time.

SUMMARY OF THE INVENTION

In view of the above-described problems of the prior art, the present invention has an object to provide an optical information reading apparatus that is capable of easily selecting a code that a user wants to read in a case that plural codes are present in a two-dimensional space and is also capable of shortening the processing time.

In order to accomplish the above and other related objects, the present invention provides an optical information reading apparatus including image pickup means, guide light irradiating means, processing mean, and detecting means. The image pickup means has a two-dimensional imaging visual field to capture an image of a reading objective containing a code recorded or printed thereon. The guide light irradiating means is provided for irradiating a guide light on the reading objective to indicate a reading portion. The processing mean is provided for performing read processing of the code based on the image picked up by the image pickup means. The guide light emitted from the guide light irradiating means indicates a two-dimensional region as a reading portion that is narrower than the imaging visual field. The detecting means is provided for detecting an irradiated position of the guide light on the imaging visual field of the image pickup means. The processing means primarily selects a code entirely contained in the two-dimensional region as a read processing objective based on detection result of the detecting means, when a plurality of codes are present in the two-dimensional region shown by the guide light.

According to this arrangement, the guide light irradiating means is arranged for irradiating a guide light on a reading objective to indicate a two-dimensional region representing a reading portion. A user locates the reading apparatus in the vicinity of a reading objective to cause the apparatus to read a code. The user adjusts the position of the apparatus in such a manner that a code to be read from the reading objective is contained in the two-dimensional region indicated by the guide light when capturing an image. Thus, the present invention enables the apparatus to easily select and read an intended code to be read from the reading objective.

An optical axis of a guide light emitted from the guide light irradiating means does not physically agree with (i.e. inclines with respect to) an optical axis of a light received by the image pickup means when capturing an image. Thus, an irradiated position of the guide light shifts on the imaging visual field of the image pickup means in accordance with distance change between the apparatus and the reading objective. On the other hand, the present invention provides the detecting means for detecting the irradiated position of the guide light on the imaging visual field of the image pickup means. Therefore, the present invention can cause the reading apparatus to surely capture a code positioning within the two-dimensional region indicated by the guide light as a read processing objective without being restricted by the location of the guide light irradiating means. Furthermore, the processing means of the present invention primarily selects a code entirely contained in the two-dimensional region as a read processing objective, when a plurality of codes are present in the two-dimensional region shown by the guide light as a reading portion that is narrower than the imaging visual field. Therefore, the present invention can restrict the image region becoming a processing objective. The processing time can be shortened.

In this case, it is possible to arrange the guide light irradiating means so as to irradiate the light having a shape of line, line segment, or point in projection along an outer periphery of the two-dimensional region, or irradiating the light toward the entire region of the two-dimensional region, thereby indicating a two-dimensional region as the reading portion. In any case, a user can easily identify the two-dimensional region indicated as a reading portion.

Furthermore, this invention provides a practical arrangement for the above-described detecting means for detecting the irradiated position of a guide light on the imaging visual field of the image pickup means. It is desirable that the image pickup means captures a first image under a condition that the guide light is irradiated on the reading objective and subsequently captures a second image under a condition that the guide light is not irradiated on the reading objective. The detecting means obtains the irradiated position of the guide light on the imaging visual field based on data of the first image and judges a same position on the second image as the irradiated position of the guide light. With this arrangement, the present invention enables the reading apparatus to adequately detect the irradiated position of a guide light on the imaging visual field of the image pickup means with a relatively simple arrangement.

Furthermore, it is possible to arrange the above-described processing means so as to divide a region of a picked-up image captured by the image pickup means into a plurality of blocks, check bright and dark levels of respective pixels in each image block as well as change in the bright and dark levels, and estimate an existing region of the code by making a judgment as to the possibility of containing at least part of the code in each image block based on the result of the check process.

With this arrangement, the present invention enables the reading apparatus to roughly estimate the existing region of a code contained in the picked-up image. It becomes possible to substantially reduce or restrict a region serving as a read processing objective. The processing time can be further shortened.

Furthermore, it is preferable that the processing means selects only the image contained in the two-dimensional region indicated by the guide light as a processing objective image. With this arrangement, the processing time can be shortened. Furthermore, it is preferable that the processing means selects a code closest in distance to a central position of the two-dimensional region as the read processing objective when plural codes are entirely contained in the two-dimensional region indicated by the guide light. With this arrangement, not only the processing time can be shortened but also the reading apparatus can surely read a code that a user want to read.

Furthermore, it is preferable that, when it fails in reading the code and the cause of failure is derived from a condition that part of the code exists outside the two-dimensional region indicated by the guide light, the processing means expands a processing objective region outward from the two-dimensional region and then executes the read processing again with an expanded processing objective region. With this arrangement, even if the user's positioning of a code relative to a guide light is inaccurate, it becomes possible to almost eliminate failure (i.e. error) in the code reading operation. Moreover, it is preferable that, when it executes the read processing again, the processing means expands the processing objective region so as to include a region adjacent to the existing region being estimated as containing the code. With this arrangement, it becomes possible to prevent the processing objective region from being widened unnecessarily and accordingly prevent the processing time from becoming unnecessarily long.

Furthermore, in order to accomplish the above and other related objects, the present invention provides a method for optically reading an information code including the following seven steps.

A first step is provided for irradiating a guide light indicating a two-dimensional reading portion, which is smaller than an imaging visual field of image pickup means, on a reading objective. A second step is provided for capturing a first image of the reading objective under irradiation of the guide light. A third step is provided for detecting the position of the guide light based on captured first image data. A fourth step is provided for capturing a second image of the reading objective after stopping irradiation of the guide light. A fifth step is provided for estimating an existing region of an information code in the second image. A sixth step is provided for selecting, as a processing objective, only an information code that is completely contained in the two-dimensional reading portion when a plurality of codes are present in the two-dimensional reading portion indicated by the guide light. And, a seventh step is provided for executing the decode processing only for the selected information code.

Preferably, the guide light has a shape of line, line segment, or point in projection defining an outer periphery of the two-dimensional reading portion. Alternatively, the guide light is a light irradiating the entire region of the two-dimensional reading portion.

Preferably, the optical information reading method of the present invention further includes a step of obtaining the irradiated position of the guide light on the imaging visual field based on data of the first image, and a step of judging a same position on the second image as the irradiated position of the guide light.

Preferably, the optical information reading method of the present invention further includes a step of dividing a region of a picked-up image captured by the image pickup means into a plurality of blocks, a step of checking bright and dark levels of respective pixels in each image block as well as change in the bright and dark levels, and a step of estimating an existing region of the information code by making a judgment as to a possibility of containing at least part of the information code in each image block based on the result of the checking step.

Preferably, the optical information reading method of the present invention further includes a step of selecting an image contained in the two-dimensional reading portion indicated by the guide light as a processing objective image.

Preferably, the optical information reading method of the present invention further includes a step of selecting an information code closest in distance to a central position of the two-dimensional reading portion as the read processing objective when plural information codes are entirely contained in the two-dimensional reading portion indicated by the guide light.

Preferably, the optical information reading method of the present invention further includes a step of expanding a processing objective region outward from the two-dimensional reading portion and then executing read processing with an expanded processing objective region in case of failure in reading the information code and when the cause of failure is derived from a condition that part of the information code exists outside the two-dimensional reading portion indicated by the guide light.

In this case, in executing the read processing, it is preferable to expand the processing objective region so as to include a region adjacent to the existing region being estimated as containing the information code.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

Hereinafter, a hand-operated type (i.e. handy type) two-dimensional code reading apparatus will be explained in accordance with one embodiment of the present invention with reference to FIGS. 1 through 7.

Figure 3:
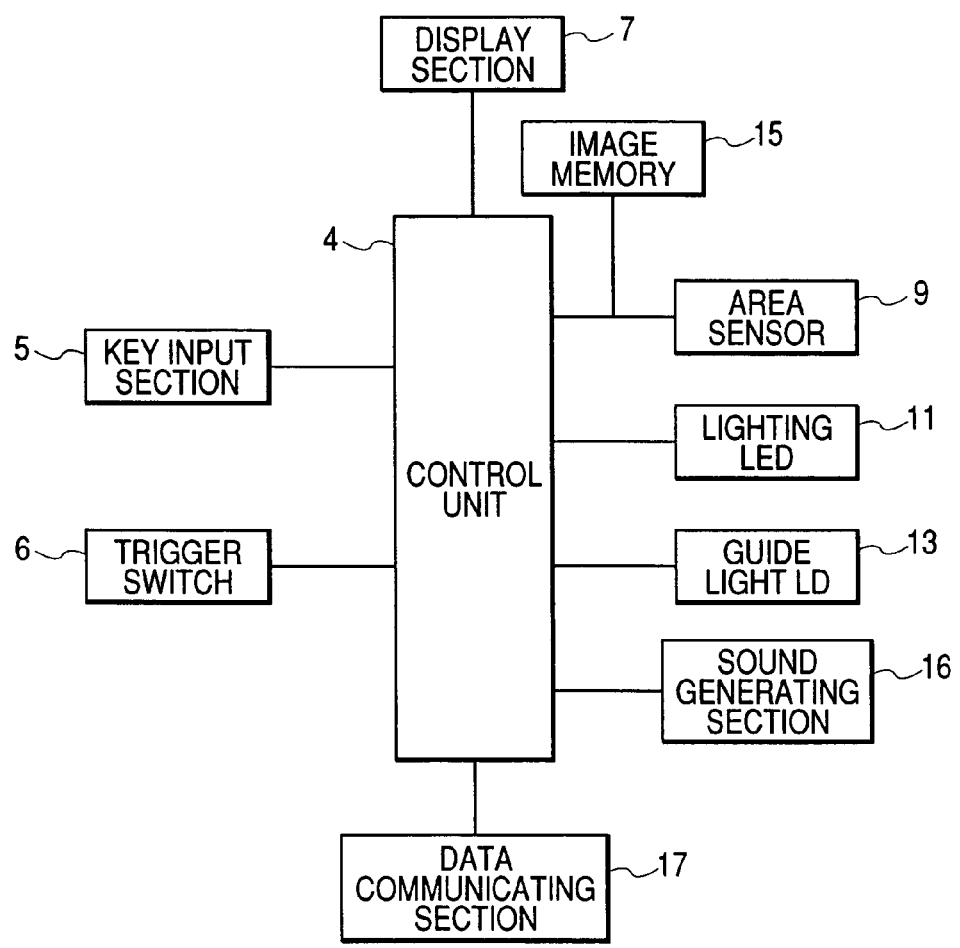
FIG. 3 is a block diagram schematically showing an electric arrangement of a two-dimensional code reading apparatus in accordance with the preferred embodiment of the present invention.
Figure 4:
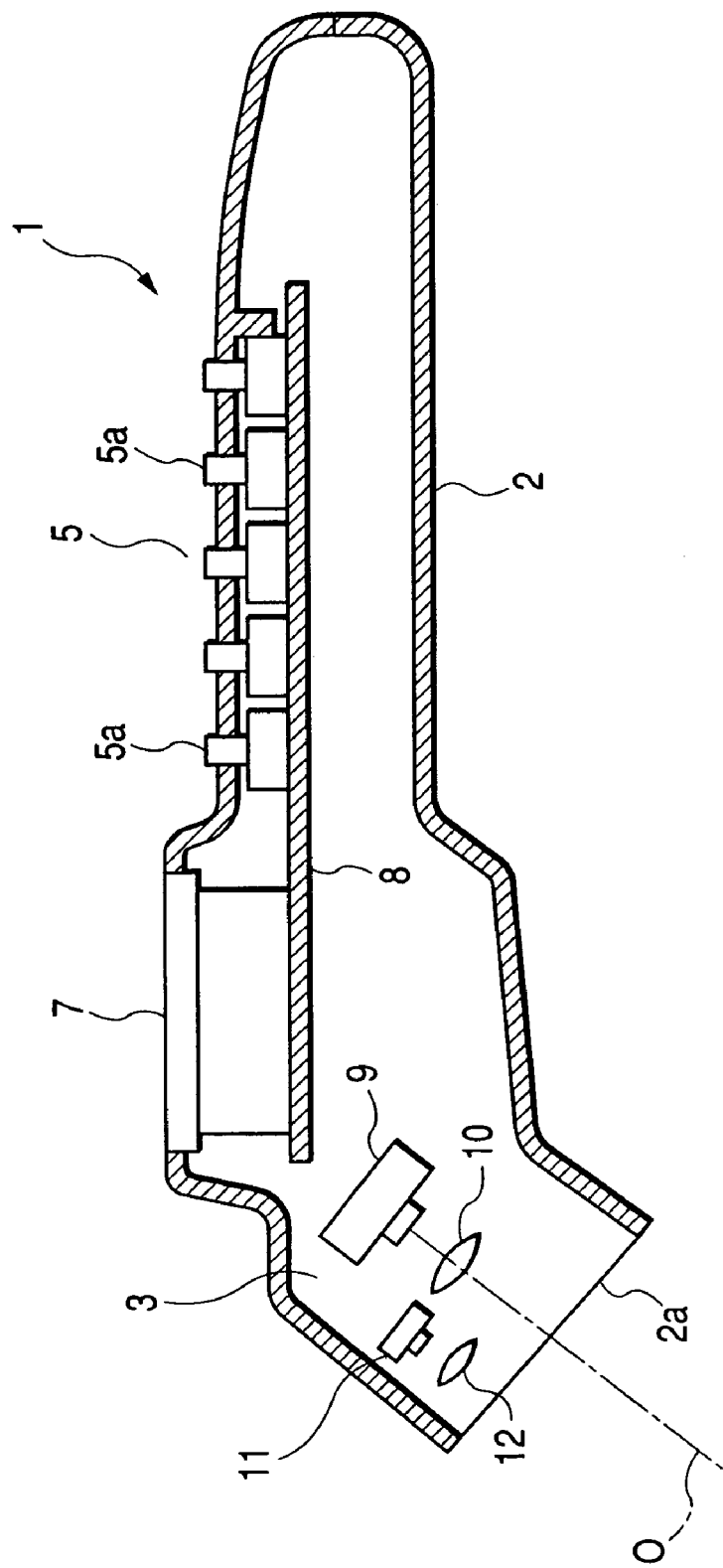
FIG. 4 is a vertical cross-sectional view showing a mechanical arrangement of the two-dimensional code reading apparatus in accordance with the preferred embodiment of the present invention.

FIG. 4 is a diagram schematically showing a mechanical arrangement of a two-dimensional code reading apparatus 1 serving as an optical information reading apparatus in accordance with this embodiment. The two-dimensional code reading apparatus 1 includes a reading mechanism 3 and a control unit 4 (refer to FIG. 3) incorporated in a casing 2. The reading mechanism 3 is provided for reading a two-dimensional code C, such as a QR code, recorded on a catalog, a voucher, a merchandise label or other reading objective (refer to FIGS. 2A and 2B). The control unit 4 is chiefly arranged by a microcomputer to perform an overall control of the system as well as function as a processing means for performing read processing (and decode processing) of a two-dimensional code C based on image data being picked up by the reading mechanism 3 (i.e. area sensor).

The casing 2 is configured into a grip portion at its proximal end (i.e. right side in the drawing) and is slightly widened at its front end. The front part of the casing 2 is also bent downward slightly so as to extend forward with a declining angle. The front end portion of the casing 2 has a reading aperture 2a. A key input section 5, consisting of a plurality of key switches 5a, is provided on an upper surface of this casing 2. The key input section 5 allows a user to select a reading program and designate a code type.

Furthermore, besides the key switches 5a, the casing 2 has a trigger switch 6 (only shown in FIG. 3) used for read instruction that is provided on an outer surface (e.g., on a side surface) of the casing 2. The trigger switch 6 is, for example, arranged to cause a two-step motion when it is depressed by a user. Although explained later in more detail, a first stage depressing action by a user (i.e. a so-called half depressed condition of the switch) causes the system to initiate an irradiating operation of the guide light and a second stage depressing action by the user causes the system to execute the reading operation.

Furthermore, a display section 7, which is for example arranged by an LCD (i.e. liquid crystal display), is provided on an upper surface of the casing 2. These key switches 5a and the display section 7 are mounted on a printed circuit board 8 disposed in the casing 2. Although not shown in the drawings, the control unit 4 is also mounted on the printed circuit board 8. Although not shown in the drawings, a secondary battery serving as a power source is incorporated in the casing 2.

The reading mechanism 3 includes an area sensor 9, an image pickup lens 10, a plurality of lighting LEDs (i.e. light-emitting diodes) 11, and a plurality of lighting lenses 12. The area sensor 9 is, for example, arranged by a CCD (i.e. charge coupled device) image pickup element so as to serve as an image pickup means of the present invention. The image pickup lens 10 is positioned in front of the area sensor 9. Each lighting LED 11 serves as a lighting source emitting a light during a code reading operation. And, each lighting lens 12 is positioned in front of a corresponding lighting LED 11.

In this case, the area sensor 9 is arranged to have a two-dimensional imaging visual field F consisting of, for example, lateral 640 pixels×vertical 480 pixels (refer to FIGS. 2A, 2B and 5 to 7). Although not shown in detail, the image pickup lens 10 is disposed at the center of a reading aperture 2a with a plurality of lighting lenses 12 disposed around it (e.g. at an obliquely upper portion).

With this arrangement, a user brings the reading aperture 2a to the vicinity of a reading objective (voucher, label, catalog. etc.) on which a code C is recorded or printed and then performs a reading operation, i.e. turns on the trigger switch 6. In response to the user's operation, the system causes the lighting LED 11 to irradiate the reading objective. In this condition, the area sensor 9 captures an image of the reading objective (i.e. performs an image pickup operation). Then, based on the picked-up image data, the control unit 4 performs read (decode) processing for this two-dimensional code C.

Figure 2A:
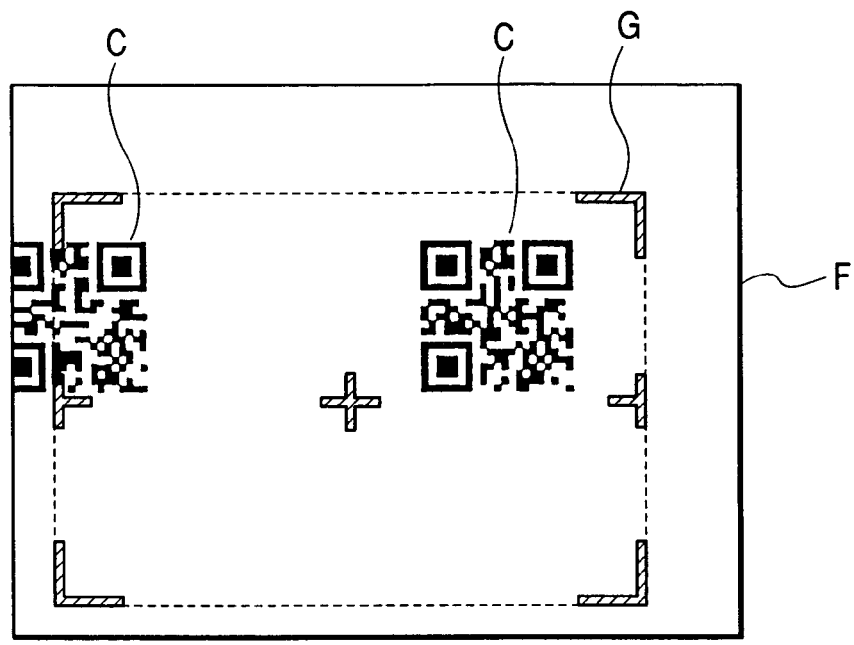
FIGS. 2A and 2B are views respectively showing an example of the positional relationship between two-dimensional codes and a guide light on an imaging visual field.
Figure 2B:
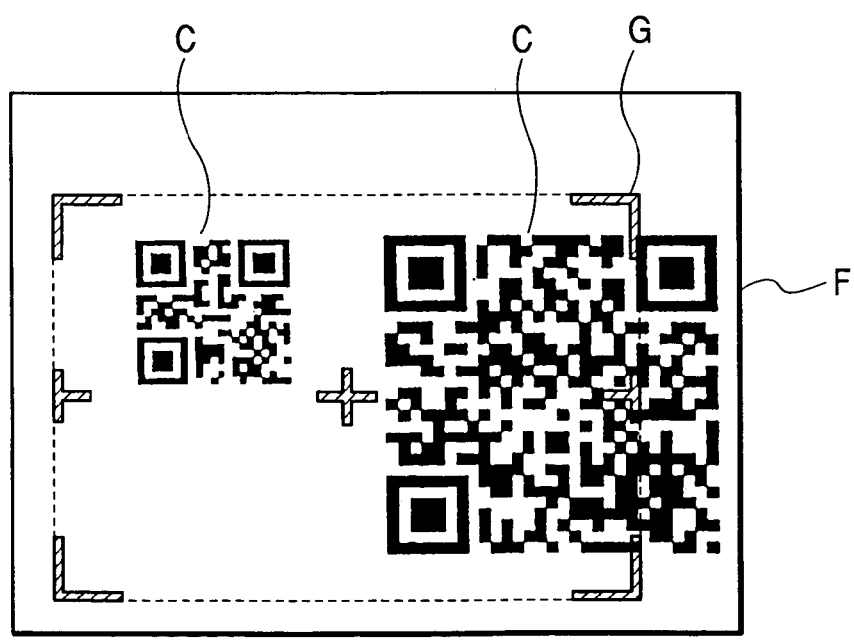
Figure 5:
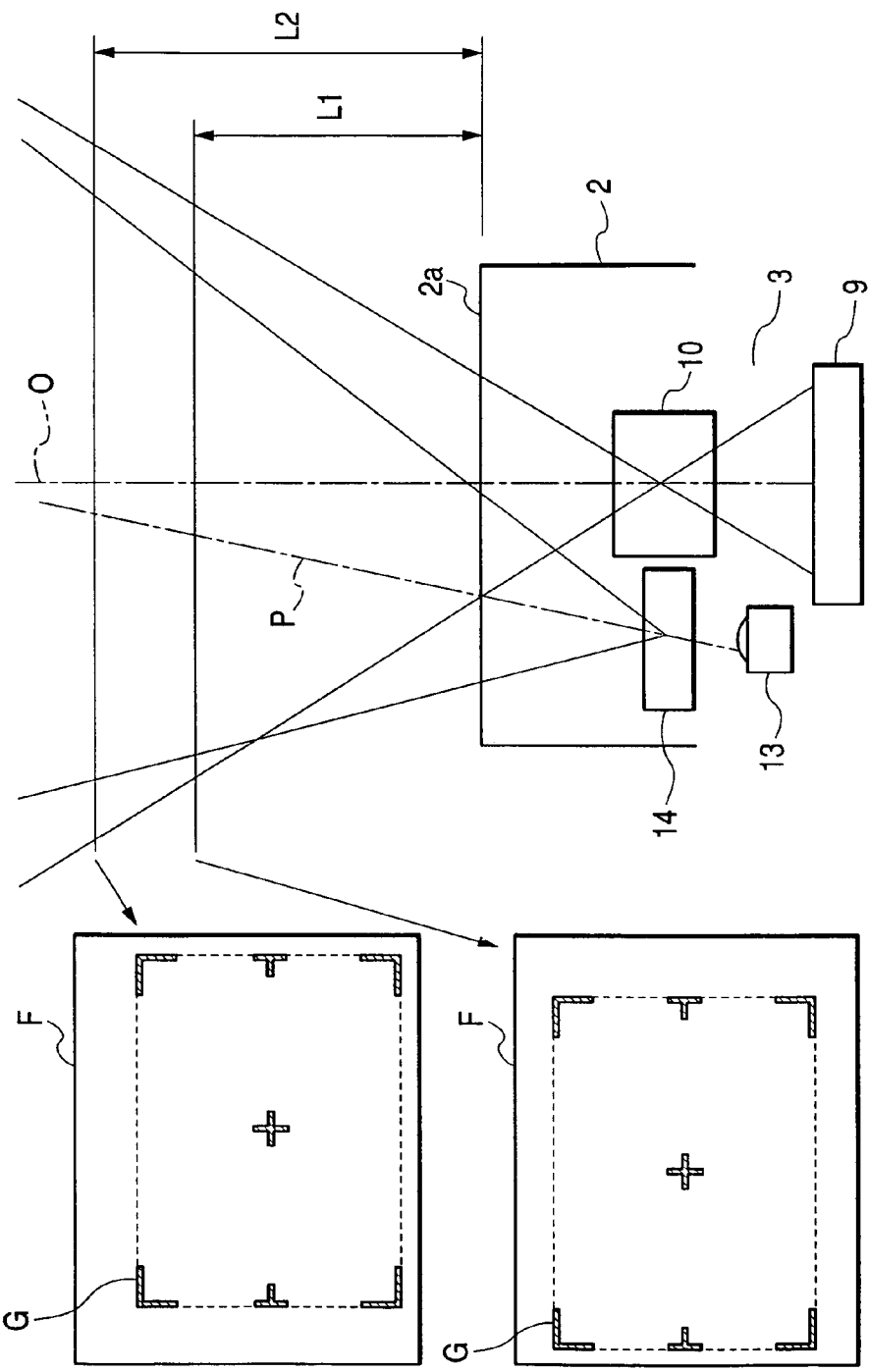
FIG. 5 is a diagram explaining a position change of a guide light in accordance with the change of a reading distance.

The reading mechanism 3 includes a guide light laser diode 13 serving as a guide light irradiating means and a floodlight lens 14 as shown in FIG. 5. The guide light laser diode 13 and the floodlight lens 14 are, for example, positioned on the side (e.g. left in the drawing) of the area sensor 9 (and image pickup lens 10). As shown in FIGS. 2A and 2B, they irradiate a guide light G toward a reading objective to indicate a reading portion.

The reading portion is set as a rectangular two-dimensional region that is smaller than the imaging visual field F of the area sensor 9. The guide light G is a line segment light indicating an outer periphery (i.e. a frame) of this two-dimensional region. More specifically, according to this embodiment, the guide light G consists of four L-shaped light portions defining four corners of a two-dimensional region, two T-shaped light portions indicating respective centers of right and left sides of this two-dimensional region, and a cross light portion indicating a center of the two-dimensional region.

An optical axis P of the guide light irradiating means (i.e. guide light laser diode 13) does not physically agree with (i.e. inclines with respect to) an optical axis O of a light received by the area sensor 9. Therefore, as shown in FIG. 5, the irradiated position of the guide light G shifts on the imaging visual field F of the area sensor 9 in accordance with a change of the distance between the reading aperture 2a and the reading objective. More specifically, when the distance between the reading aperture 2a and the reading objective is short (i.e. distance L1), the irradiated guide light G is offset toward a left side of the imaging visual field F. On the other hand, when the distance between the reading aperture 2a and the reading objective is long (i.e. distance L2), the irradiated guide light G is offset toward a right side of the imaging visual field F.

FIG. 3 is a circuit diagram schematically showing an electric arrangement of the two-dimensional code reading apparatus 1 including the control unit 4 as a main component. The control unit 4 inputs operation signals of the key input section 5 and the trigger switch 6 and controls the display section 7. The control unit 4 controls each lighting LED 11 and the guide light laser diode 13.

The control unit 4 inputs picked-up image data of a reading objective captured by the area sensor 9 and performs the decode processing. Although not shown in the drawings, the control unit 4 further includes an amplifier for amplifying an image pickup signal of the area sensor 9 and a binary circuit for converting a sensor signal into binary-coded data. An image memory 15 is connected to the control unit 4 and to the area sensor 9. The control unit 4 is connected to a sound generating section 16 that generates a buzzer sound upon completion of a reading operation of a two-dimensional code C. The control unit 4 is also connected to a data communicating section 17 that performs data communication of the decoded data with an external device (e.g. managing computer) via an infrared ray.

The two-dimensional code reading apparatus 1 executes the following operations with a software arrangement of the control unit 4 (i.e. execution of a reading program). More specifically, when a user operates the trigger switch 6 in a half depressed condition (i.e. in response to user's first stage depressing action), the control unit 4 activates the guide light laser diode 13 to irradiate a guide light G indicating a reading portion (i.e. a two-dimensional region) on a reading objective. Subsequently, in response to a complete depression of the trigger switch 6 (i.e. in response to user's second stage depressing action), the control unit 4 causes the area sensor 9 to capture an image of the reading objective. The capturing of this image is separated into two stages. In a first stage, the area sensor 9 captures a first image under the condition that the guide light G is irradiated on the reading objective (i.e. under the condition that no lighting beam is irradiated). Subsequently, in a second stage, the area sensor 9 captures a second image under the condition that the guide light G is not irradiated on the reading objective (i.e. under the condition that the lighting beam is irradiated).

In this case, the control unit 4 obtains an irradiated position of the guide light G on the imaging visual field F based on image data of the first image and regards a same position on the second image as the irradiating position of the guide light G. In the first image, the irradiated position of the guide light G is sufficiently bright compared with the other portion. Thus, it is easy to identify the position of the guide light G based on brightness of the image data. Accordingly, the control unit 4 can function as a detecting means of the present invention.

Then, the control unit 4 performs the read processing (decode processing) for a two-dimensional code C based on image data of the second image. In this case, based on detected position of the guide light G in the above-described imaging visual field F, the control unit 4 designates a two-dimensional code C contained in the reading portion (i.e. two-dimensional region) of the guide light G as a processing objective. In a case that plural codes C are present in the two-dimensional region, the control unit 4 primarily designates a two-dimensional code C completely contained in the two-dimensional region as a read processing objective. Furthermore, according to this embodiment, in performing the decode processing, the control unit 4 first executes the processing for estimating an existing region of a two-dimensional code C in the second image and then reads a bright and dark pattern in the estimated existing region of the two-dimensional code C.

Figure 6:
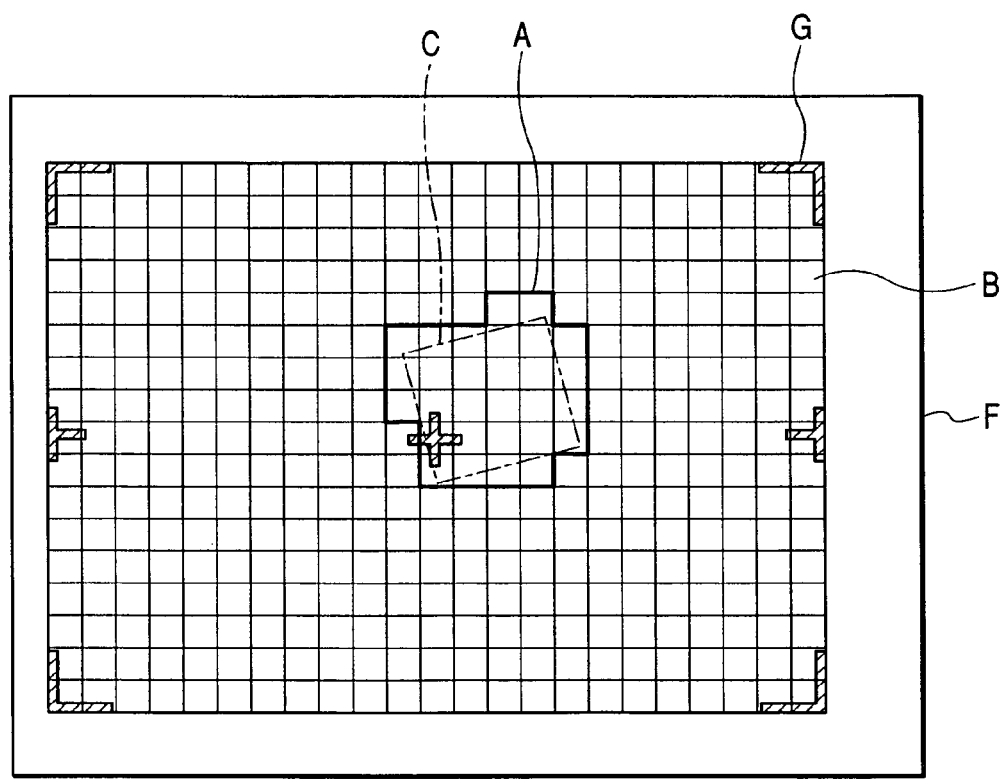
FIG. 6 is a view explaining the processing for estimating an existing region of a two-dimensional code in accordance with the preferred embodiment of the present invention.
Figure 7:
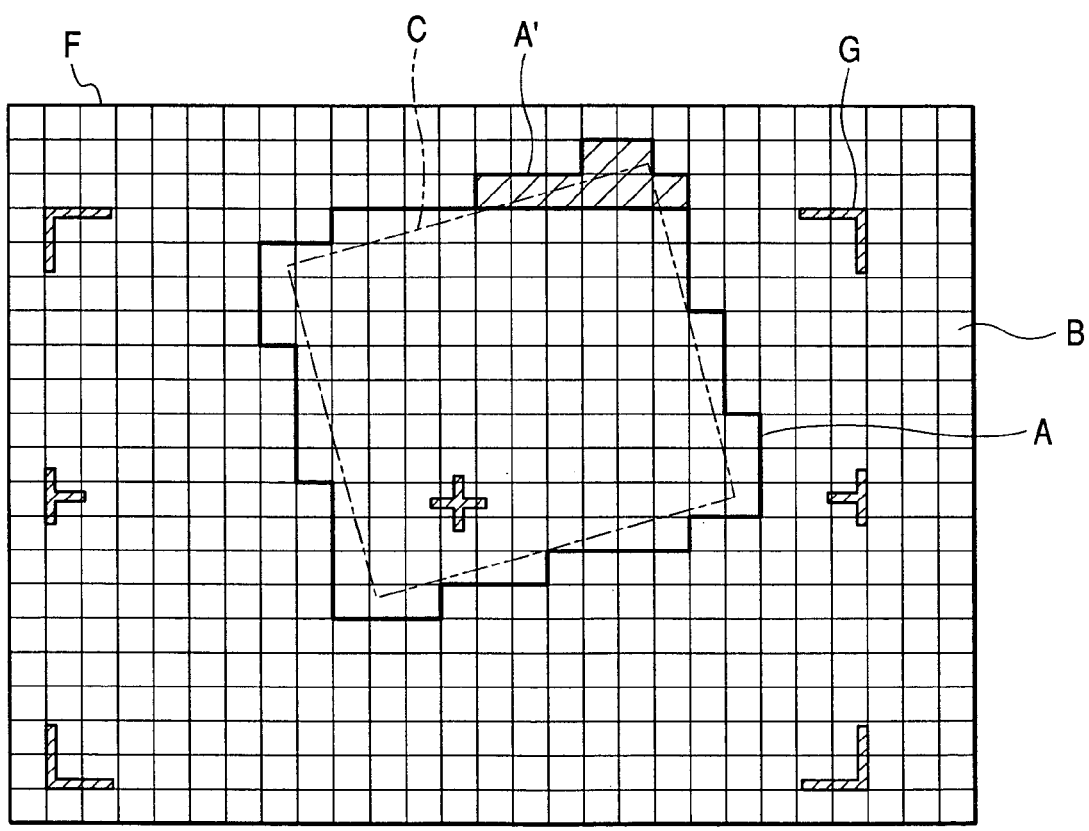
FIG. 7 is a view explaining a processing objective region expanded in accordance with the preferred embodiment of the present invention when an image of a two-dimensional code is partly out of a reading portion.

Although not explained in detail, the processing for estimating the existing region of a two-dimensional code C is performed as partly shown in FIGS. 6 and 7. Namely, the control unit 4 divides a captured region of a picked-up image (i.e. second image) into a plurality of image blocks B (i.e. check areas) arrayed in vertical and lateral directions. Then, the control unit 4 checks bright and dark levels of respective pixels in each image block B as well as change in the bright and dark levels. Then, based on its result (i.e. the number of bright and dark change points), the control unit 4 extracts an image block B having a higher possibility of containing at least part of a two-dimensional code C. For example, each image block B has a size of 16 pixels×16 pixels. Regarding the processing for estimating the existing region, this applicant has already proposed the detailed processing as disclosed in the Japanese patent application Laid-open No. 2002-304594 or in the Japanese patent application Laid-open No. 2000-353210.

Furthermore, according to this embodiment, when it performs the decode processing, the control unit 4 designates only an image contained in the two-dimensional region indicated by the guide light G as a processing objective image. When it fails in reading (decoding) a two-dimensional code C and the cause of failure is derived from a condition that part of the two-dimensional code C exists outside the two-dimensional region indicated by the guide light G, the control unit 4 expands a processing objective region outward from the two-dimensional region and then executes the read processing again with an expanded processing objective region. Then, when it executes the read processing again, the control unit 4 expands the processing objective region so as to include a region adjacent to the two-dimensional region being estimated as containing the two-dimensional code C (refer to FIG. 7).

Next, functions of the above-described arrangement will be explained with reference to FIG. 1. According to the two-dimensional code reading apparatus 1 in accordance with the above-described embodiment of the present invention, a user shifts the reading aperture 2a of the casing 2 toward a reading objective in reading a two-dimensional code C recorded or printed on the reading objective and, under this condition, the user depresses the trigger switch 6 provided on the side surface of the casing 2 into a half depressed condition. This user's first stage depressing action applied on the trigger switch 6 causes the system to irradiate the guide light G onto the reading objective so as to indicate a reading portion (i.e. a two-dimensional region) as described above. Thus, the user can position an intended two-dimensional code C to be read within the two-dimensional region indicated by the guide light G while visually confirming the indicated reading portion on the reading objective. Then, the user makes the second-stage depressing action for the trigger switch 6.

Figure 1:
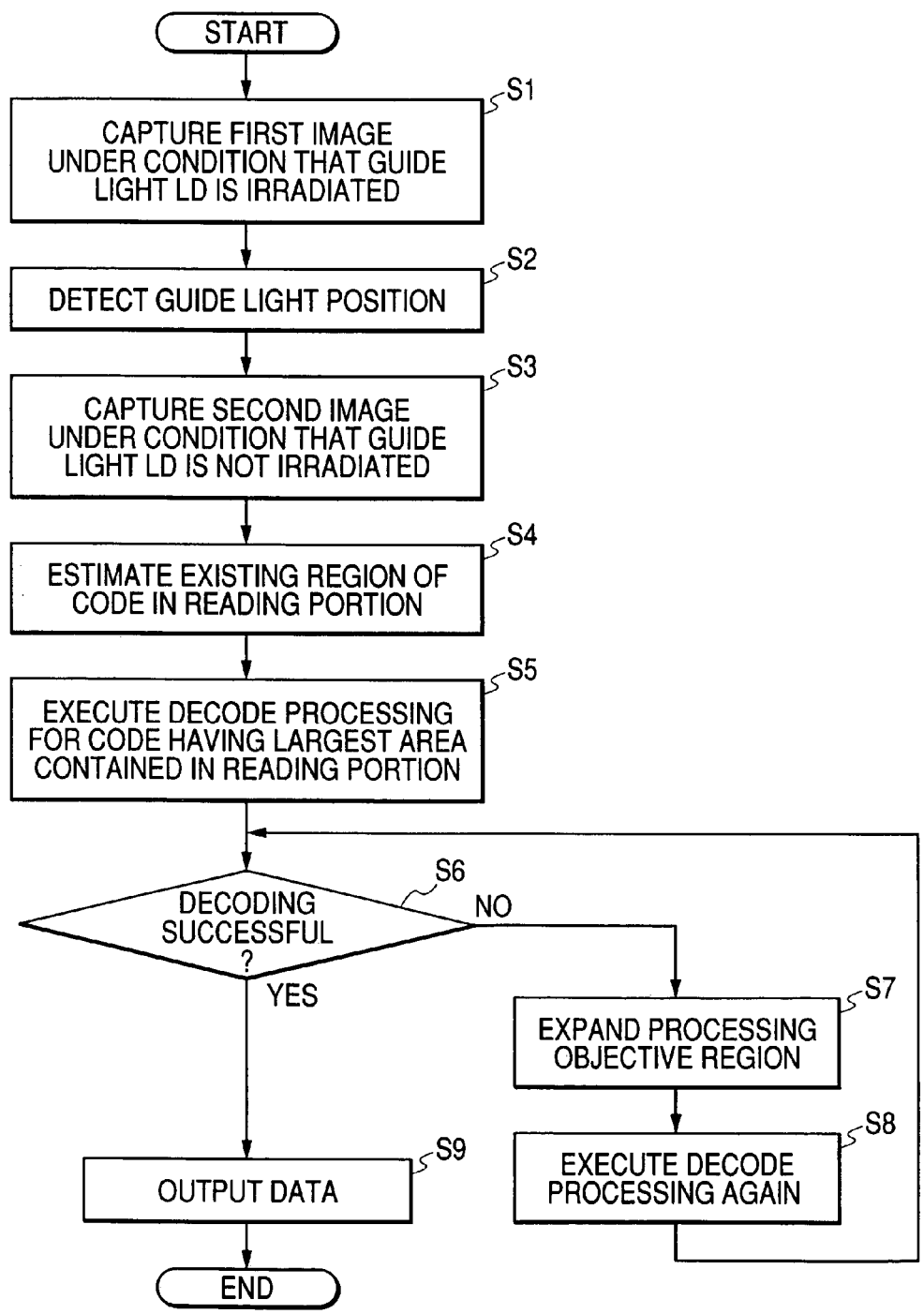
FIG. 1 is a flowchart showing the processing procedure during a code reading operation in accordance with one embodiment of the present invention.

The control unit 4 executes the read processing in accordance with the flowchart shown in FIG. 1. More specifically, as shown in step S1, the control unit 4 causes the area sensor 9 to execute capturing of a first image under the condition that the guide light G is irradiated on the reading objective (i.e. under that condition that the lighting beam is not irradiated yet). Next, in step S2, the control unit 4 executes the processing for obtaining an irradiated position of the guide light G (i.e. a two-dimensional region defining a reading portion) on the imaging visual field F based on the captured first image data. This enables the system to easily detect the position of the guide light G even if position of the guide light G shifts on the imaging visual field F captured by the area sensor 9 in accordance with a change of the distance between the reading aperture 2a and the reading objective as shown in FIG. 5.

Subsequently, in step S3, the control unit 4 deactivates the guide light laser diode 13 to stop the emission of guide light G. Instead, the control unit 4 turns on the lighting LED 11 and causes the area sensor 9 to capture the second image under the condition that a lighting beam is irradiated on the reading objective. After finishing the capturing of the second image, the control unit 4 proceeds to the next step S4 to execute the processing for estimating the existing region of an image of a two-dimensional code C in the reading portion on the imaging visual field F (i.e. a two-dimensional region indicated by the guide light G). In performing this processing, the control unit 4 divides the region of the second image into a plurality of image blocks B arrayed in vertical and lateral directions as described above (refer to FIGS. 6 and 7) and checks bright and dark levels of respective pixels in each image block B as well as change in the bright and dark levels. For example, according to an example shown in FIG. 6, the region 'A' encircled by a bold line includes pixel data whose bright and dark levels change. Thus, the control unit 4 estimates the region 'A' as an existing region of the two-dimensional code C.

In step S5, the control unit 4 designates the two-dimensional code C contained in the reading portion (i.e. the two-dimensional region) as a reading objective and executes the decode processing for the designated reading objective. This decode processing is carried out only for the processing objective image contained in the two-dimensional region indicated by the guide light G. In this case, the second image may include a plurality of (e.g. two) two-dimensional codes C that are present on the imaging visual field F as shown in FIG. 2A. In such a case, the control unit 4 primarily designates one two-dimensional code C as a read processing objective if it is completely contained in the reading portion (i.e. in the two-dimensional region). Therefore, the control unit 4 selects a two-dimensional code C positioned on the right side of the drawing as a reading objective. In this respect, when the captured two-dimensional codes have the same size, the control unit 4 selects a two-dimensional code C having a largest area contained in the reading portion and executes the decoding processing for the selected code.

Meanwhile, according to an example shown in FIG. 2B, the control unit 4 selects a two-dimensional code C positioned on the left side of the drawing as a reading objective.

As apparent from the foregoing description, an objective region for the decode processing is not equal to the entire region of the imaging visual field F and is limited to the reading portion (i.e. two-dimensional region) narrower than the imaging visual field F of the area sensor 9 and further limited to the existing region through the above-described step S4 (i.e. the region indicated by a bold line 'A' in FIG. 6). Hence, it becomes possible to shorten the processing time correspondingly.

Then, in step S6, the control unit 4 makes a judgment as to whether or not the decode processing for the selected two-dimensional code C is successful. When the decode processing is successful (i.e. YES in step S6), the control unit 4 outputs the decoded data in the next step S9. For example, the control unit 4 causes the display section 7 to display the decoded data and transmits the decoded data to a managing computer. Then, the control unit 4 terminates the processing routine of the flowchart shown in FIG. 1. On the other hand, as shown in FIG. 7, there is a case that an image of the two-dimensional code C may be partly present out of the reading portion (i.e. two-dimensional region) due to failure in the user's positioning operation for capturing the image or other reason. In such a case, the two-dimensional code C exits partly outside the processing objective image and accordingly the processing for decoding it will end unsuccessfully (i.e. NO in step S6).

Hence, when the decoding is unsuccessful, the control unit 4 proceeds to a step S7 to expand the processing objective region outward from the present reading portion (i.e. two-dimensional region). Then, in step S8, the control unit 4 executes the decode processing again and returns to the step S6. In widening the processing objective region in step S7, the control unit 4 expands the processing objective region by selectively adding a portion adjacent to a region which is estimated as containing the two-dimensional code C among the image regions (i.e. image blocks B) positioned outside (i.e. along the periphery of) the two-dimensional region. According to the example shown in FIG. 7, the control unit 4 expands the processing objective region by adding a portion A' consisting of a plurality of blocks B and indicated as a hatched region existing along the upper side of the reading portion (i.e. two-dimensional region). With this adjustment, the control unit 4 can adequately perform the decode processing.

Hence, even in a case that the positioning of a two-dimensional code C relative to the guide light G is inaccurate, the control unit 4 will not fail in reading a two-dimensional code C unless the two-dimensional code C is completely out of the imaging visual field F. Furthermore, in executing the decode processing again, the control unit 4 needs not to widely expand the processing objective region so as to include unnecessary regions. Therefore, it becomes possible to prevent the processing time from becoming long.

As described above, this embodiment uses a guide light G defining a two-dimensional region narrower than the imaging visual field F of the area sensor 9 and irradiates the guide light G to indicate a reading portion on a reading objective. This embodiment detects an irradiated position of the guide light G on the imaging visual field F and selects only a two-dimensional code C contained in the two-dimensional region indicated by the guide light G as a read processing objective. Accordingly, this embodiment enables the system to easily select an intended two-dimensional code C that a user wants to read among a plurality of two-dimensional codes C existing in a two-dimensional space. Furthermore, this embodiment enables the system to limit or reduce the region of an image serving as a processing objective. Thus, this embodiment can shorten the processing time.

Furthermore, this embodiment divides the image region being picked up by the area sensor 9 into a plurality of image blocks B. This embodiment estimates an existing region of the two-dimensional code C based on the check result with respect to the bright and dark levels of pixels in each image block B as well as change in the bright and dark levels. Thus, this embodiment enables the system to substantially reduce the region serving as a read processing objective. The processing time can be further shortened.

Furthermore, this embodiment selects only an image contained in the two-dimensional region indicated by the guide light G as a processing objective image. However, in case of failure in reading a two-dimensional code C, this embodiment expands the processing objective region outward so as to include an adjacent region and executes the decode processing again. Thus, even when the user's positioning of a two-dimensional code C relative to the guide light G is inaccurate, this embodiment can eliminate reading errors of this two-dimensional code C. Furthermore, this embodiment can prevent the processing time required in this case from becoming long.

Figure 8:
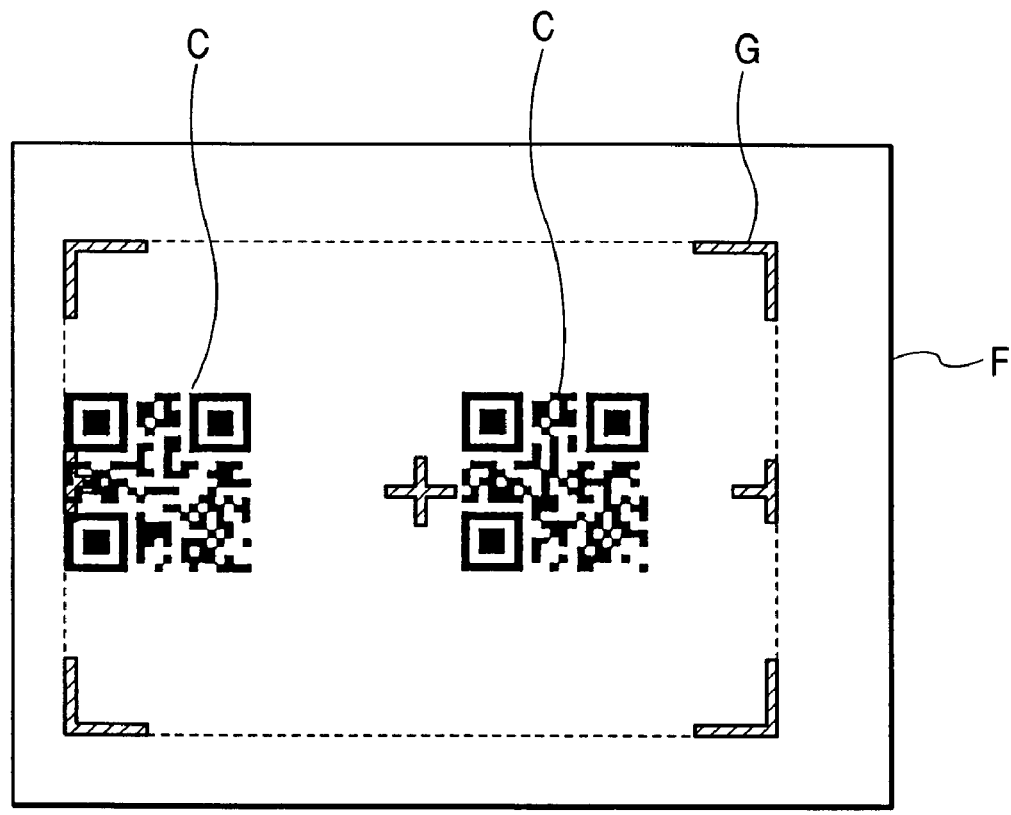
FIG. 8 is a view corresponding to FIGS. 2A and 2B but showing another embodiment of the present invention.

FIG. 8 is a view showing another embodiment of the present invention. According to this embodiment, a plurality of two-dimensional codes C recorded or printed on a reading objective are disposed with a relatively short distance between them. These plural (two in this example) two-dimensional codes C are completely present in a two-dimensional region indicated by the guide light G on the imaging visual field F. In such a case, the control unit 4 designates one two-dimensional code C closest in distance to a central position of the two-dimensional region as a read processing objective (i.e. a right one in the drawing).

According to this arrangement, a user is only required to position or locate a two-dimensional code C to be read closely to the central position of the two-dimensional region indicated by the guide light G. Thus, not only this embodiment can reduce the processing time but also this embodiment enable a user to surely accomplish the read processing for an intended two-dimensional code C only.

According to the above-described embodiment, in case of failure in reading a two-dimensional code C, the control unit 4 expands the processing objective region outward so as to include an adjacent region and executes the decode processing again. However, in case of failing in the reading operation, it is also desirable to inform a user of any reading errors so as to let the user perform the reading operation again. More specifically, it is desirable to designate only a code completely contained within a two-dimensional region indicated by the guide light G as a read processing objective. Furthermore, it is preferable to provide a means for measuring a distance (i.e. a reading distance) from the casing 2 (i.e. the reading aperture 2a) to a reading objective. In this case, for example, the detecting means can be modified so as to indirectly obtain the position of the guide light G on the imaging visual field F based on the measured reading distance.

The present invention is not limited to the above-described embodiments. For example, regarding the irradiation pattern of the guide light, it is also possible to irradiate a light having the shape of a plurality of line segments or points in projection for defining a frame along an outer periphery of a two-dimensional region. It is also possible to use a light irradiating the entire of a two-dimensional region. Furthermore, the optical information reading apparatus according to the present invention is not limited to a reading operation for a two-dimensional code and therefore can be used for reading a bar code or other one-dimensional code. In this respect, the present invention can be adequately modified and brought into practice without departing from the gist of the present invention.

What is claimed is:

1. An optical information reading apparatus comprising:
   image pickup means having a two-dimensional imaging visual field for capturing an image of a reading objective containing an information code recorded thereon;
   guide light irradiating means for irradiating a guide light on said reading objective to indicate a reading portion; and
   processing mean for performing read processing of said information code based on the image picked up by said image pickup means,
   wherein
   the guide light emitted from said guide light irradiating means indicates a two-dimensional region as the reading portion,
   the two-dimensional portion is narrower than said imaging visual field,
   detecting means is provided for detecting an irradiated position of said guide light on said imaging visual field of said image pickup means, and
   said processing means primarily selects an information code entirely contained in said two-dimensional region as a read processing objective based on detection result of said detecting means, when a plurality of codes are present in the two-dimensional region indicated by said guide light.

2. The optical information reading apparatus in accordance with claim 1, wherein said guide light irradiating means is arranged for irradiating a light having a shape of line, line segment or point in projection along an outer periphery of said two-dimensional region, or irradiating a light toward the entire region of said two-dimensional region, thereby indicating the two-dimensional region as said reading portion.

3. The optical information reading apparatus in accordance with claim 1, wherein
   said image pickup means captures a first image under a condition that said guide light is irradiated on said reading objective and subsequently captures a second image under a condition that said guide light is not irradiated on said reading objective, and
   said detecting means obtains an irradiated position of said guide light on said imaging visual field based on data of said first image and judges a same position on said second image as the irradiated position of said guide light.

4. The optical information reading apparatus in accordance with claim 1, wherein said processing means is arranged for dividing a region of a picked-up image captured by said image pickup means into a plurality of blocks, checking bight and dark levels of respective pixels in each image block as well as change in said bright and dark levels, and estimating an existing region of said information code by making a judgment as to a possibility of containing at least part of said information code in said each image block based on the result of the checking process.

5. The optical information reading apparatus in accordance with any claim 1, wherein said processing means selects only the image contained in the two-dimensional region indicated by said guide light as a processing objective image.

6. The optical information reading apparatus in accordance with claim 5, wherein said processing means selects an information code closest in distance to a central position of said two-dimensional region as said read processing objective when plural codes are entirely contained in the two-dimensional region indicated by said guide light.

7. The optical information reading apparatus in accordance with claim 5, wherein said processing means, when it fails in reading be information code and the cause of failure is derived from a condition that part of said information code exists outside the two-dimensional region indicated by said guide light, expands a processing objective region outward from said two-dimensional region and then executes said read processing again with an expanded processing objective region.

8. The optical information reading apparatus in accordance with claim 7, wherein said processing means, when it executes the reed processing again, expands the processing objective region so as to include a region adjacent to the existing region being estimated as containing said information code.

9. The optical information reading apparatus in accordance with claim 1 further comprising lighting means for irradiating light onto the reading objective.

10. The optical information reading apparatus in accordance with claim 1 further comprising a light source for irradiating the reading objective with light, wherein the light source is separate from the guide light irradiating means.

11. A method for optically reading an information code comprising the steps of:
   irradiating a guide light indicating a two-dimensional reading portion, which is smaller than an imaging visual field of image pickup means, on a reading objective;
   capturing a first image of said reading objective under irradiation of said guide light
   detecting the position of said guide light based on captured first image data;
   capturing a second image of said reading objective alter stopping irradiation of said guide light;
   estimating an existing region of an information code in the second image;
   selecting, as a processing objective, only an information code that is completely contained in said two-dimensional reading portion when a plurality of codes are present in said two-dimensional reading portion indicated by said guide light; and
   executing decode processing only for said selected information code.

12. The optical information reading method in accordance with claim 11, wherein said guide light has a shape of line, line segment, or point in projection defining an outer periphery of said two-dimensional reading portion, or said guide light is a light irradiating one entire region of said two-dimensional reading portion.

13. The optical information reading method in accordance with claim 11, further comprising steps of;
   obtaining an irradiated position of said guide light on said imaging visual field based on data of said first image, and
   judging a same position on said second image as the irradiated position of said guide light.

14. The optical information reading method in accordance with claim 11, further comprising steps of:
   dividing a region of a picked-up image captured by said image pickup means into a plurality of blocks,
   checking bright and dark levels of respective pixels in each image block as well as change in said bright and dark levels, and
   estimating an existing region of said information code by making a judgment as to a possibility of containing at least part of said information code in said each image block based on the result of the checking step.

15. The optical information reading method in accordance with claim 11, further comprising a step of selecting an image contained in said two-dimensional reading portion indicated by said guide light as a processing objective image.

16. The optical information reading method in accordance with claim 15, further comprising a step of selecting an information code closest in distance to a central position of said two-dimensional reading portion as said read processing objective when plural information codes are entirely contained in said two-dimensional reading portion indicated by said guide light.

17. The optical information reading method in accordance with claim 15, further comprising a step of expanding a processing objective region outward from said two-dimensional reading portion and then executing read processing with an expanded processing objective region in case of failing in reading the information code and when the cause of failure is derived from a condition that part of said information code exists outside said two-dimensional reading portion indicated by said guide light.

18. The optical information reading method in accordance with claim 17, wherein in executing the read processing the processing objective region is expanded so as to include a region adjacent to the existing region being estimated as containing said information code.

19. The method in accordance with claim 11 further comprising irradiating light onto the reading objective separately from the guide light.

* * * * *